June 23, 1925.
R. CANDRIANI
SECURITY MEANS FOR CHECKS
Filed Dec. 20, 1921
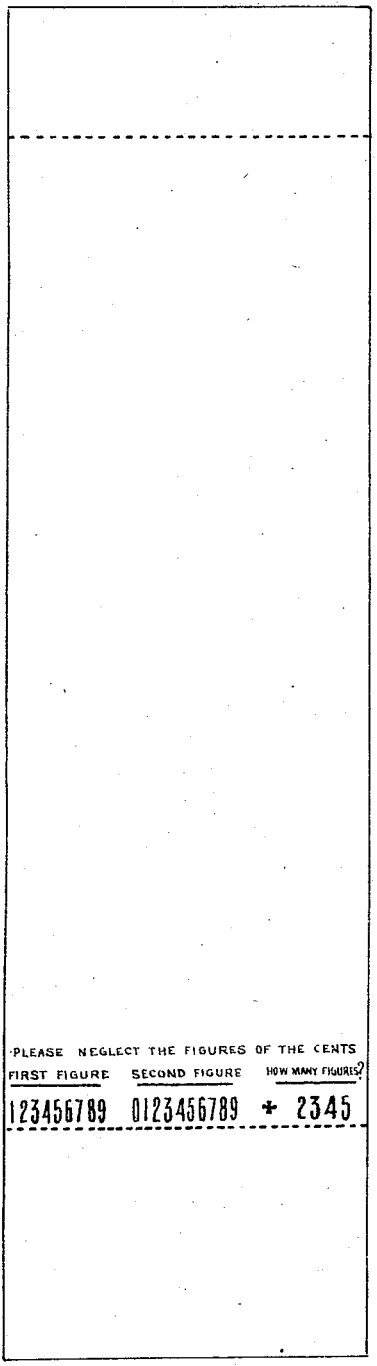
Fig. 1.
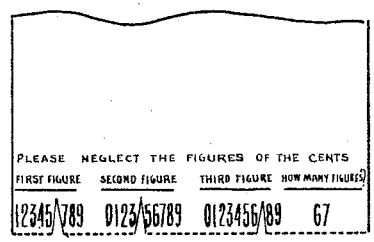
Fig. 4.
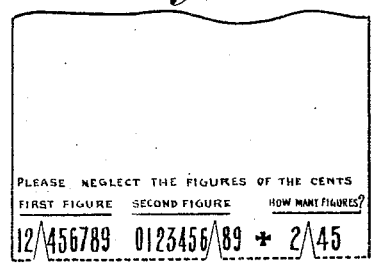
Fig. 3.
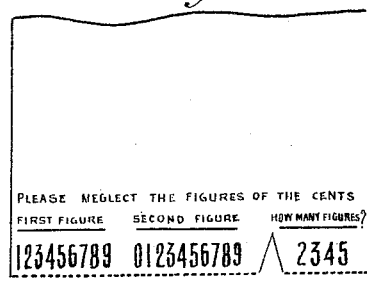
Fig. 2.
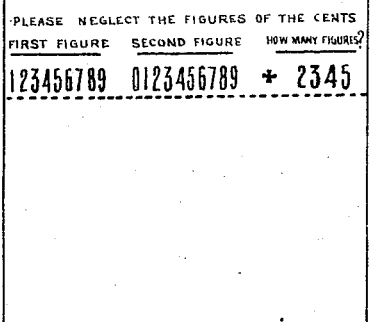
Inventor:
Ricardo Candriani,
by Emery, Booth, Janney & Varney,
Attys.

Patented June 23, 1925.

1,543,366

UNITED STATES PATENT OFFICE.

RICARDO CANDRIANI, OF BUENOS AIRES, ARGENTINA.

SECURITY MEANS FOR CHECKS.

Application filed December 20, 1921. Serial No. 523,761.

*To all whom it may concern:*

Be it known that I, RICARDO CANDRIANI, a subject of the King of Italy, residing at Calle Maipu 671, Buenos Aires, Argentine Republic, have invented an Improvement in Security Means for Checks, of which the following description, in connection with the accompanying drawings, is a specification, like characters on the drawings representing like parts.

This invention relates to improvements in checks which I have devised in order to avoid the fraudulent alterations which are frequently effected in these orders of payment.

On the improved check in accordance with my invention three series of figures are printed. The first series is formed by the figures 1 to 9; the second series, by the figures 0 to 9, while the third series consists of the figures 2 to 7. This latter is preceded by a star. All the figures of each series succeed each other in the progressive order.

The three series and the star can be printed on the front as well as the back of the check.

The customer, after having filled in and signed the check, will perforate or cut out:

In the first series, the figure equal to the first figure of the number corresponding to the amount of the check.

In the second series, the figure equal to the second figure of said number.

Besides, if two figures constitute the number corresponding to the amount (not taking into account the cents), then the signer will perforate or cut out from the third series the 2; if there are three figures the 3; if there are four, the 4; if there are five, the 5, and so on.

In case the amount is less than ten dollars, he will only perforate or cut the star.

According to my invention, the combination of figures above set forth, can be used for checks of any value. It is hardly admissible that a swindler should try to raise a check for a large amount in order to increase its value by a comparatively small quantity.

Notwithstanding, for values higher than 99,999.99, the banks may use checks having printed thereon four series of figures instead of three, and the signer may then mark in the manner above set forth the three first figures of the number corresponding to the amount, in lieu of the first two figures only.

In consequence, a bank may adopt two classes of checks, one for amounts up to 99,999.99 and the other class for values above that amount.

In order to facilitate the understanding of this description, illustrative drawings have been annexed thereto, wherein:

Figure 1 shows a check in accordance with my invention, corresponding to the type of the first class.

Figure 2 illustrates a check delivered for an amount less than $10, which is marked by cutting out the star by means of an angular cut.

Figure 3 is still another illustration of a check delivered for an amount represented by a number consisting of three figures, not taking into account the cents, the first two of which are the 3 and the 7, as indicated in an indelible manner by the cuts.

Figure 4 represents a check corresponding to the second class, in which the star has been eliminated and the total of figures of the last series has been reduced to 6 and 7. Besides, the series of figures has been increased by one series, so as to allow of marking the first three figures of the number corresponding to the amount, instead of the first two figures as in the preceding cases.

The perforating or printing devices which are actually used for marking a check with its amount, are expensive and can only be used in the office.

The method and device in accordance with my present invention offer, in comparison with the known methods, the advantage of being simple and cheap.

My invention is based on the consideration that in order to avoid alterations in the value of checks, it would be sufficient to mark thereon, in an indelible manner, the first two or the first three figures of the number corresponding to the amount stated, provided an indication, also indelible, were conjointly given as to of how many figures consisted said number, not taking into account the cents.

I now declare that what I claim as new and desire to secure by Letters Patent of the United States, is:

1. A check or other order for the payment of a sum of money, comprising three groups of figures, each group having the figures in consecutive order and each group having appropriate headings adapting it to have a figure thereof treated to indicate, in one group one figure of the amount of the check, in another group another figure of the amount of the check, and in the remaining group the total number of figures of the integer of the amount of the check.

2. A check or other order for the payment of a sum of money, comprising three groups of figures each group having appropriate headings adapting it to have a figure thereof treated to indicate, in one group one figure of the amount of the check, in another group another figure of the amount of the check, and in the remaining group the total number of figures of the integer of the amount of the check, and a sign adapted to be treated to indicate that the amount of the check is less than a given amount.

3. A check or other order for the payment of a sum of money, comprising three groups of consecutively arranged figures, each group having appropriate headings adapting it to have a figure thereof treated to indicate, in the first group the first figure of the amount of the check, in the second group the second figure of the amount of the check, and in the third group the total number of figures of the integer of the amount of the check.

4. A check or other order for the payment of a sum of money, comprising three groups of figures each group having appropriate headings adapting it to have a figure thereof treated to indicate, in the first group the first figure of the amount of the check, in the second group the second figure of the amount of the check, and in the third group the total number of figures of the integer of the amount of the check, and a sign to be treated to indicate that the amount of the check is less than a given amount.

5. A check or other order for the payment of a sum of money, comprising three groups of figures, each group having appropriate healings adapting it to have a figure thereof treated to indicate, in the first group the first figure of the amount of the check, in the second group the second figure of the amount of the check and in the third group the total number of figures composing the integer of the amount of the check, the figures of the first group beginning with the numeral 1, those of the second group with 0 and those of the third group with the numeral 2.

6. A check or other order for the payment of a sum of money, comprising a plurality of groups of figures, each group having appropriate headings adapting it to have a figure thereof treated to indicate, in one of the groups the total number of figures composing the integer of the check and in each of the other groups one of the figures of the check, the numerals of each group being in consecutive order.

7. A check or other order for the payment of a sum of money, comprising a plurality of groups of figures, each group having appropriate headings adapting it to have a figure thereof treated to indicate, in one of the groups the total number of figures composing the integer of the check and in each of the other groups one of the figures of the check; and a sign adapted to be treated to indicate that the amount of the check is less than a given amount.

8. A check or other order for the payment of a sum of money, comprising a plurality of groups of figures, each group having appropriate headings adapting it to have a figure thereof treated to indicate, in one of the groups the total number of figures composing the integer of the check and in each of the other groups one of the figures of the check, one or more groups beginning with a zero.

In testimony whereof, I have signed my name to this specification.

RICARDO CANDRIANI.